United States Patent Office 2,914,345
Patented Nov. 24, 1959

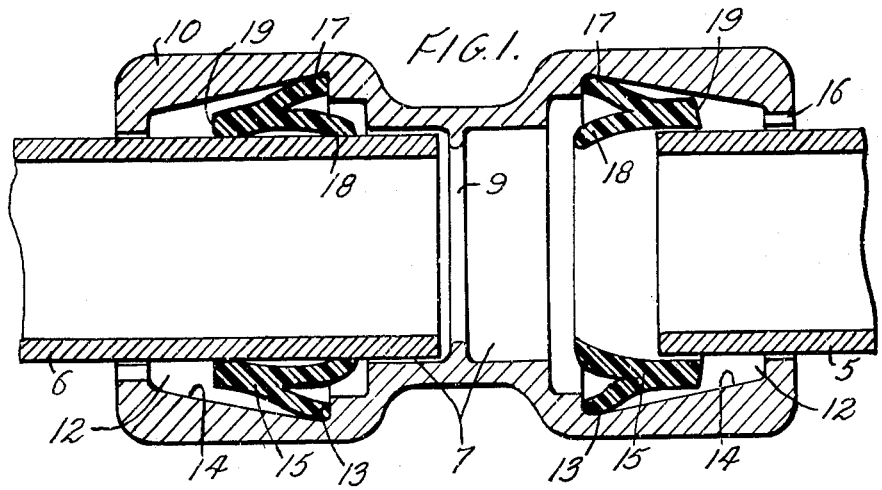
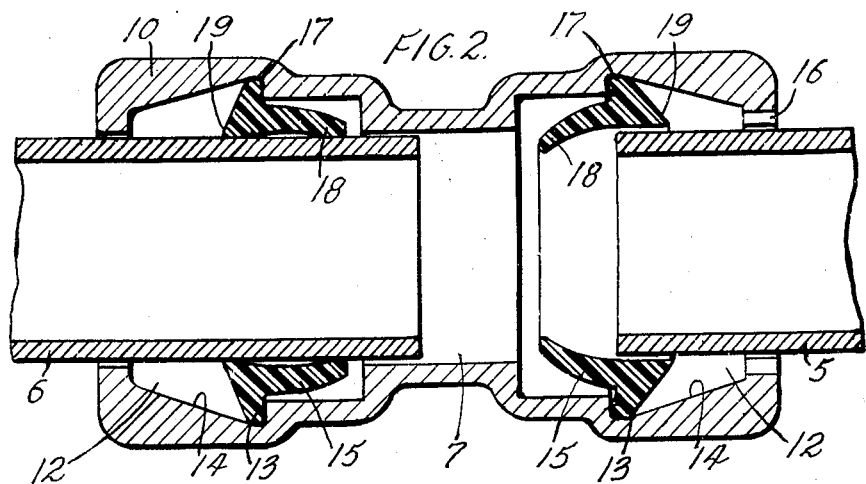
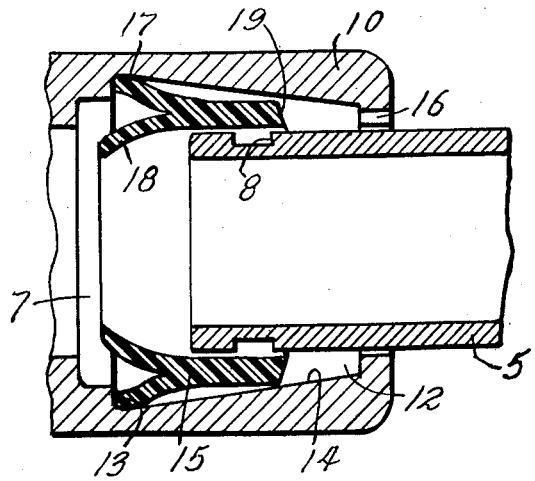

2,914,345

PIPE JOINT

Alden E. Osborn, Mount Vernon, N.Y.

Substituted for abandoned application Serial No. 322,280, November 24, 1952. This application December 17, 1958, Serial No. 780,922

4 Claims. (Cl. 285—110)

The object of this invention is to provide a pipe coupling or joint by means of which the pipe to be connected can simply be pushed into the fitting or coupling without the use of tools and without requiring special skill on the part of those performing connecting operations.

It provides that the gasket or leakage preventing member is automatically tightened against the entrance of material into the pipe from the exterior thereof when the pipe is being inserted through said gasket or member, and for making the fluid pressure from the interior of the pipe, after its full insertion, result in a heavy mechanical tightening pressure on said gasket or member through its compression between the surrounding surfaces and the pipe.

While the pipe joints, as illustrated in the accompanying drawing, are of the form with which the customary methods of preventing pipe separation, such as by friction of the surrounding earth or by having the ends of the pipe line held from movement through blocking, are used, it should be understood modifications can be made and that a locking means can be provided between the pipes and/or coupling members to hold the pipes in place, although such means is not illustrated herein because my present invention is not related to such locking means, and a locking means is not essential to my invention or to its functioning.

In the accompanying drawing:

Fig. 1 represents a longitudinal sectional elevation of a coupling embodying one form of my invention, Fig. 2 represents a longitudinal sectional elevation of the coupling of Fig. 1 with a modified form of gasket, and Fig. 3 represents a longitudinal sectional elevation of a pipe bell end or a part of a coupling and illustrates a further modification of the gaskets of Figs. 1 and 2.

In Fig. 1 the coupling 10 is provided with two internal channels or grooves 12 which are adjacent to the ends of the coupling and are provided with internal tapered or slanting wall surfaces 14 and contain the joint sealing means or gaskets 15. The ends of the coupling are provided with keys 16 to centralize the pipe, while the keyways or spaces between the keys serve as openings through which the tool or tools can be inserted to expand the gasket by moving it into the larger end of the channel space. The gaskets 15 fill only a part of the coupling channels so that, when the pipes are in position, they would, at first, be at the inner larger diameter end of the channels while, when fluid pressure is brought into the coupling through the pipes and passage 7, they would move toward the smaller end of the channel tapered space and be compressed between the pipes and the interior surface of the channels in the same way as are the gaskets of the pipe joints disclosed in my patent No. 2,590,656, except that, in this case, the taper surfaces are in the interior of the coupling instead of on the exterior of the pipes. One of the gaskets is shown (at the pipe 5 end) in the position it assumes before a pipe is fully inserted, while the other gasket is shown (at the pipe 6 end) in the position it assumes after the pipe is inserted, but before internal pressure has been applied.

The gaskets, in Figs. 1 and 3, in addition to being arranged for sliding to a tightened position at the small end of the gasket channels, have a Y-section formed with an outer branch 17 of the Y, that engages the inner surface 14 of the coupling channel and is held from inward longitudinal movement by a shoulder 13 in said channel, an inner branch 18, that engages the pipe, and an outwardly extending or stem part 19. When these gaskets are inserted into the coupling channels, the outerbranch is compressed and contracted, with the result that the outwardly-extending or stem part 19 is raised and slightly expanded so that the end of the pipe 5 can be passed into it without catching on this stem end. As the pipe is being pressed into the gasket, the gasket tends to roll because it is held by the outer branch part and said shoulder and is only prevented from turning over by the outwardly extending or stem part with the result that the end of this part is brought into forcible contact with the pipe. The object of this gasket form is to permit the easy insertion of the end of the pipe into the gasket and to thereafter prevent leakage into the pipe (should a vacuum occur therein or should the pipe become submerged before pressure has been exerted to move the gasket to its wedged position) by having the extended part first press against the outer surface of the pipe and thereafter having any pressure from outside the pipe tend to force the gasket against it because the gasket is held from longitudinal movement by said shoulder 13 at a point outside the line of pressure and is thus subjected to additional rolling and contracting pressure.

In Fig. 2 is shown a coupling and modified form of gasket which, like the gasket of Fig. 1, has its outwardly extending part 19 opening larger in diameter than the pipe when the pipe is inserted through this part only, as shown at the pipe 5 end, and has this outer part closed on the pipe when the pipe is passed through the gasket as shown at the pipe 6 end. The outwardly extending part 19 of the gasket of Fig. 2 is at a considerable angle to the axis of the pipe before the pipe 5 has been passed through it and, as the pipe enters the inner branch 18 of the gasket, this extended part 19 is caused to straighten out and be compressed between the inner surface of the coupling channel 12 and the pipe, thus closing a passage into the pipe from any fluid or material on the outside thereof as shown at the pipe 6 end. The straightening of the extended part of the gasket can be very forcible depending on the angle it assumes between the coupling wall and pipe and the amount of pressure required to force the pipe through the inner branch 18 of the gasket. The gasket is also made tighter by the pressure on its outer surface than is the case with the gasket of Figs. 1 and 3. In this figure the centralizing rib 9 of Fig. 1 is shown as removed in order that the entire coupling can be slid onto one of the pipes.

In Fig. 3 is illustrated a modification of the gasket of Fig. 1, that can also be applied to the gasket of Fig. 2, whereby the catching of the gasket end on the pipe groove 8 shoulder is avoided by having the inwardly projecting part 18 of the gasket, with which the pipe end contacts, at a considerable distance inside of the outwardly extending part 19 of the gasket that is to be drawn against the pipe by its insertion so that this outer part only presses against the pipe after the pipe groove shoulder has passed it and thus cannot catch in the pipe groove. This modified type of gasket can be arranged to move along the internal tapered surface of a coupling to tighten it between the pipe and coupling in the same way as occurs with the gaskets shown in Figs. 1 and 2, when the pipe has been inserted and internal pipe pressure is applied to the inner surface of the gasket.

I claim:

1. A pipe joint comprising a member having a socket therein into which a pipe end portion with a groove in the outer surface thereof can be inserted, a circumferential channel within said socket, a ring gasket in said channel and having a relatively large diameter part thereof engaging the inner wall of said channel, an inner part having a normal diameter less than the diameter of the outer surface of said pipe separated from said large diameter part thereof and engageable with said pipe when positioned within said socket, and a third part extending axially outward from said first-mentioned parts and having an inner normal diameter greater than that of the adjacent outer surface of said pipe with at least the end of said third part being also engageable with said positioned pipe end portion, and means whereby said pipe end portion can be inserted into said gasket without interference between said third-mentioned extended part of said gasket and a shoulder of the groove of said pipe end portion, said means comprising having the outer end of the said third-mentioned part of said gasket longitudinally spaced from said smaller diameter inner part sufficiently to receive the grooved pipe end portion therein whereby said third-mentioned part extends beyond the groove of said pipe when the end of said pipe is being inserted into said smaller diameter part with said third mentioned part contracting on said pipe end portion only after said pipe end portion is within said smaller diameter part and said groove is within the end of said third-mentioned part.

2. A pipe joint comprising a member having a socket therein, an internal circumferential channel within said socket end having a slanting wall to form a tapered space when the pipe is positioned in said socket, a gasket means within said channel and adapted to surround the pipe and to be moved by fluid pressure from within the pipe towards the small end of said tapered space, with said gasket having an axially inner end normally of smaller internal diameter than the outside of the pipe and an axially outer projecting end, before the insertion of the end of said pipe entirely through said gasket, of larger internal diameter than the outside diameter of the pipe, means to contract said enlarged end of said gasket into pressure contact with the outer surface of said pipe, comprising a radial shoulder within said socket member channel of larger radius than the outside of said pipe with a radially outer portion of said gasket bearing on said shoulder whereby said gasket is caused to tilt about said shoulder bearing upon the longitudinal movement of said pipe through said smaller inner diameter end of the gasket, and means whereby each of said gasket ends is additionally sealed against both positive and negative pressure occurring in the joint by the subjection of the outer surfaces of said gasket ends to pressure to force the inner surface thereof into tighter engagement with said pipe.

3. A pipe joint comprising a member having a socket therein, an internal circumferential channel within the socket of said member with said channel having an internally tapered wall whereby the inner end of said channel is larger in diameter than the outer end thereof, a pipe having an end extending into said socket and through said channel whereby a tapered circumferential space is formed between the internal tapered wall of said channel and said pipe, a gasket slidably mounted in said channel and surrounding said pipe and initially positioned in the larger end of said tapered space and having an outer surface thereof engaging an inner wall of said channel, an inner surface thereof having a normal diameter less than the diameter of the outer surface of the pipe and engaging the external surface of said pipe, and an axially outwardly extending part connected to the parts having the surfaces engaging said socket member and pipe with said extended part having a normal diameter larger than the diameter of the outer surfaces of the pipe positioned to be out of contact with the outer surface of said pipe while said pipe is within the said extended part only and with at least the free end of said outwardly extending part being normally positioned to contact with said pipe and seal against external pressure after said pipe is inserted further into said gasket and is inside said second-mentioned gasket surface, and a passage between the open end of said pipe and the inner surface of said gasket whereby fluid pressure from said pipe acts on said gasket to forcibly move said gasket towards the smaller end of said tapered channel.

4. A pipe joint comprising a member having a socket therein, a circumferential channel formed within said socket of said member, a ring gasket of elastomeric material disposed in said channel, said gasket having an axially extending thickened portion constituted by radially inner and outer faces and having at a terminal end thereof a radially extending face substantially normal to the axially extending inner and outer faces whereby sharp corners are formed at the intersecting edges, a radially outer flexible first lip portion extending from the other end of said thickened portion the terminal end of which projects radially outwardly from the outer face of said thickened portion, a radially inwardly extending flexible second lip portion extending from said thickened portion, the terminal end of which projects radially inwardly from the inner face of said thickened portion whereby said gasket, when unstressed, assumes substantially a Y shape in a cross section, a pipe having an end portion loosely disposed in said socket of said member, a circumferential groove in the outer surface of the pipe adjacent the end thereof received in said socket of said member, said groove defining shoulders, said second lip portion of said gasket, when in unstressed condition, having a diameter less than the outside diameter of said pipe, said radially inward face of said axially thickened portion having a diameter greater than the outside diameter of said pipe and a length sufficient to receive the grooved pipe end portion therein, whereby when the end of the pipe is being inserted into said socket of said member, said groove will freely pass the sharp edge of said axially thickened portion and will connect with and stress said first and said second lip portions into sealing contact with the outer peripheries of said channel and said pipe respectively, said stressing causing said sharp edge of said thickened portion to contact said pipe with sealing pressure thereby sealing said joint against positive and negative pressures.

References Cited in the file of this patent

UNITED STATES PATENTS

| | | |
|---|---|---|
| 2,226,304 | Dillon | Dec. 24, 1940 |
| 2,259,940 | Nathan | Oct. 21, 1941 |
| 2,443,993 | Schenkelberger | June 22, 1948 |
| 2,469,538 | Young | May 10, 1949 |
| 2,499,476 | Eyerly | Mar. 7, 1950 |
| 2,529,098 | Noll | Nov. 7, 1950 |
| 2,565,923 | Hrdlicka | Aug. 28, 1951 |
| 2,809,853 | Nathan | Oct. 15, 1957 |